(12) United States Patent
Wietham (10) Patent No.: US 7,670,482 B2
(45) Date of Patent: Mar. 2, 2010

(54) SELF-CLEANING SCREEN WITH CHECK VALVE FOR USE IN SHALLOW WATER PUMPING

(76) Inventor: Robert J. Wietham, c/o Riverscreen, Inc., 1925 Kiowa Rd., Clay Center, KS (US) 67432

( * ) Notice: Subject to any disclaimer, the term of this patent is extended or adjusted under 35 U.S.C. 154(b) by 1005 days.

(21) Appl. No.: 11/395,894

(22) Filed: Mar. 31, 2006

(65) Prior Publication Data

US 2007/0227956 A1    Oct. 4, 2007

(51) Int. Cl.
*B01D 33/00* (2006.01)
*B01D 35/00* (2006.01)
*B01D 33/044* (2006.01)

(52) U.S. Cl. .................. 210/161; 210/136; 210/402; 210/403; 210/420; 210/393

(58) Field of Classification Search ............. None
See application file for complete search history.

(56) References Cited

U.S. PATENT DOCUMENTS

| 4,346 A | * | 12/1845 | Doyle | 163/6 |
|---|---|---|---|---|
| 1,473,667 A | * | 11/1923 | Burks | 210/136 |
| 1,546,527 A | * | 7/1925 | Werner | 210/136 |
| 4,017,394 A | | 4/1977 | Hensley | |
| 4,261,822 A | * | 4/1981 | Richardson | 210/107 |
| 4,515,180 A | | 5/1985 | Napolitano | |
| 5,356,532 A | | 10/1994 | Wilkins et al. | |
| 5,392,806 A | | 2/1995 | Gallant | |
| 5,993,652 A | | 11/1999 | Stoneburner et al. | |
| 6,270,669 B1 | | 8/2001 | Bauer | |
| 6,783,330 B2 | | 8/2004 | Carnes et al. | |

FOREIGN PATENT DOCUMENTS

JP    05-332464    * 12/1993

OTHER PUBLICATIONS

Riverscreen Product Brochure, 2005.

* cited by examiner

*Primary Examiner*—Krishnan S Menon
*Assistant Examiner*—Benjamin Kurtz
(74) *Attorney, Agent, or Firm*—Jeffrey L. Thompson; Thompson & Thompson, P.A.

(57) ABSTRACT

A self-cleaning screen for shallow water pumping includes a rotatable drum made of mesh material for removing debris from water passing into the drum, and a suction chamber within the drum for feeding water to a suction pipe connected to a centrifugal pump. Inlet openings are arranged across a bottom side of the suction chamber. A check valve assembly is provided to prevent water from back flowing through the inlet openings, to thereby maintain a prime in the suction pipe when the pump is off. The check valve assembly includes valve members that are slidably mounted above the inlet openings for movement between closed and open positions. The valve members move upwardly from their closed positions to their open positions upon movement of water through the inlet openings into the suction chamber, and return to their closed positions by force of gravity when water stops flowing into the suction chamber.

12 Claims, 8 Drawing Sheets

SELF-CLEANING SCREEN WITH CHECK VALVE FOR USE IN SHALLOW WATER PUMPING

BACKGROUND OF THE INVENTION

1. Field of the Invention

The present invention relates generally to self-cleaning screen assemblies for use in shallow water pumping systems. In particular, the present invention relates to a check valve assembly for use with a self-cleaning screen in a shallow water pumping system to maintain a prime in a centrifugal pump.

2. Description of the Related Art

Centrifugal pumps are commonly used to suck water out of outdoor pits, reservoirs, streams, rivers, ponds, and the like, especially for irrigation purposes. A suction pipe or hose typically extends between the water source and the centrifugal pump for supplying water to the pump. A screen is typically used to prevent debris, sand and other objects from being sucked into the suction pipe or hose and into the pump while pumping.

Self-cleaning screens have been developed to prevent plugging by debris being drawn to the screen during pumping. An example of a self-cleaning screen is provided in U.S. Pat. No. 6,270,669 issued to Bauer. Another example of a self-cleaning screen is an earlier version of the product marketed by the Applicant under the proprietary name RIVERSCREEN™. These known products provide rotary self-cleaning drum strainers having a means for cleaning debris from a drum as the drum rotates during operation of the pump. The filtered Water passing into the drum is sucked from the interior of the drum by a suction pipe or hose for delivery to a centrifugal pump.

A well-known limitation to the use of centrifugal pumps is their limited ability to draw fluid for self-priming when starting from an air-filled or dry condition. The impeller is typically not capable of generating a sufficient vacuum when operating in air to draw liquid up to the pump when the standing level of the liquid is below the pump. Before liquid reaches the impeller, very little draw is generated by the impeller. Thus, to begin pumping, the pump must either be primed manually or be self-priming.

Self-priming centrifugal pumps are well known. Examples of such pumps are disclosed in U.S. Pat. Nos. 6,409,478 and 6,783,330 issued to Carnes et al. Although self-priming centrifugal pumps have been used effectively under some conditions, they have generally suffered from a relatively greater complexity, higher expense, unreliability, and/or an inability to lift water as high as necessary to prime the pump in some applications.

There is a need in the industry for an improved self-cleaning screen for use with a centrifugal pump to filter the water entering the pump and to maintain a prime in the pump.

SUMMARY OF THE INVENTION

The present invention provides a self-cleaning screen for shallow water pumping. The screen includes a rotatable drum having sidewalls made of a mesh material for removing debris from water as the water passes into the drum. A suction chamber is positioned within the drum for collecting and feeding water to a suction pipe that supplies a centrifugal pump. A plurality of inlet openings are arranged across a bottom side of the suction chamber. A check valve assembly prevents water from back flowing through the inlet openings, to thereby maintain water in the suction chamber and the suction pipe to keep the pump primed when it is off. The check valve assembly includes a plurality of valve members having valve stems that are slidably mounted above the inlet openings for movement between closed and open positions. The valve members have valve faces that cover the inlet openings when the valve members are in their closed positions. The valve members are movable upwardly from their closed positions to their open positions upon movement of water through the inlet openings into the suction chamber, and return to their closed positions by force of gravity when water stops flowing into the suction chamber.

According to a broad aspect of the present invention, a self-cleaning screen assembly is provided for use in shallow water pumping, comprising: a rotatable drum comprising a screen for removing debris from water as the water passes into the drum; a suction chamber positioned within the drum, the suction chamber having at least one inlet opening for receiving water from within the drum, and a discharge opening for discharging water out of the suction chamber to feed a suction pipe of a pumping unit; and a check valve assembly for allowing water to pass into the inlet opening of the suction chamber during water pumping, and for preventing water from passing back through the inlet opening when the water pumping ceases to thereby maintain a prime in a pump above the suction chamber.

According to another broad aspect of the present invention, a check valve assembly is provided for use with a centrifugal pumping system, comprising: a suction chamber having at least one inlet opening and a discharge opening; at least one valve member having a valve stem and a valve face, the valve stem being slidably received in a support structure for allowing the valve member to move between a closed position in which the valve face covers the inlet opening and an open position in which the valve face is displaced from the inlet opening; and the support structure comprising a tubular member arranged in a vertical orientation to guide the valve stem for sliding movement in a vertical direction between the closed and open positions.

According to another broad aspect of the present invention, a pumping system is provided, comprising: a suction pipe for supplying water to a centrifugal pump; a screen for preventing debris from entering the suction pipe; and a check valve assembly positioned between the screen and the suction pipe to maintain a prime in the suction pipe when the pumping system is stopped, the check valve assembly comprising at least one valve member having a valve stem and a valve face, the valve stem being slidably received in a support structure for allowing the valve member to move between a closed position in which the valve face covers an inlet opening and an open position in which the valve face is displaced from the inlet opening.

Numerous other objects and features of the present invention will be apparent to those skilled in this art from the following description wherein there is shown and described exemplary embodiments of the present invention, simply by way of illustration of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A self-cleaning screen with a check valve assembly for use in shallow water pumping according to the present invention will now be described in detail with reference to FIGS. 1 to 12 of the accompanying drawings.

The self-cleaning screen 10 includes a rotatable drum 11 having a sidewall 12 made of a mesh material for removing debris from water as the water passes into the drum 11. The drum 11 has first and second ends 13, 14 and a plurality of slat members 15 extending along a length of the drum 11 between the first and second ends 13, 14. The first end 13 of the drum 11 is supported by a shaft 16 and bearing 17 or other suitable structure to allow the drum 11 to rotate freely about a horizontal axis during operation.

The second end 14 of the drum 11 is also supported by a support structure 18 that allows the drum 11 to rotate about the horizontal axis. The second end 14 of the drum 11 has an opening 19 through which water can be taken from the interior of the drum 11. The support structure 18 for supporting the second end 14 of the drum 11 includes a pair of support wheels 20 that engage an annular flange 21 which extends around the opening 19 of the drum 11. The support structure 18 also includes a stationary plate 22 that covers part of the opening 19 in the second end 14 of the drum 11, while leaving a port 23 through which a suction pipe 24 is connected to the interior of the drum 11.

The slat members 15 are used to rotate the drum 11 by receiving a driving force from water flowing past the drum 11 (e.g., the current of a river or stream), or by receiving a driving force from a power drive system (not shown) that sprays water against the slat members 15 during pump operation. The mesh material of the sidewall 12 of the drum 11 can be, for example, #8 304 stainless steel mesh, although various other sizes and materials can be used to fit a particular pumping and screening application.

A cleaning spray is provided by a conduit 25 and a plurality of spray nozzles 26 positioned within the drum 11. The spray nozzles 26 are directed to spray water in a radially outward direction from within the drum 11 so that the sprayed water impinges against the inside surface of the mesh material 12. The cleaning spray functions to dislodge any debris stuck to the mesh material 12 of the drum 11 as the drum 11 rotates to provide a continuous, self-cleaning action on the drum 11. The cleaning spray can be supplied, for example, by diverting a small portion of the water being pumped from the pump back to the screen assembly 10.

The drum 11 is supported by a framework 27 that includes first and second beams 28, 29 positioned on either side of the drum 11. Additional cross pieces 30 and frame members 31 are positioned between the beams 28, 29 for added support and rigidity. The framework 27 is supported by a floatation structure 32, such as a plurality of floats, to ensure that the drum 11 operates at a desired depth in the water source. The floatation structure 32 prevents the drum 11 from being submerged too deep and/or from engaging a bottom surface of the water source, either of which would tend to interfere with the desired rotation of the drum 11 during operation. The floatation structure 32 can be aluminum pipe members 33 with caps 34 on the ends to make the pipe members 33 airtight and buoyant. The floatation structure 32 can also have an alternative well known construction, such as one or more foam-filled or airtight plastic containers or the like.

A suction chamber 35 is positioned within the drum 11 for collecting and feeding water to the suction pipe 24. The suction chamber 35 is mounted within the drum 11 so that the suction chamber 35 remains stationary as the drum 11 rotates around it. The suction chamber 35 is supported at its one end 36 by a rigid coupling with the suction pipe 24 and support structure 18 at the second end 14 of the drum 11, and may be supported at its other end 37 by hanging from the shaft 16 or bearing 17 that supports the first end 13 of the drum 11. The suction chamber 35 is defined by a horizontally extending structure 39-42 having an opening along a bottom portion thereof with a plate 38 positioned within the opening. More specifically, the suction chamber 35 has a generally planar bottom side formed by the plate 38, and also has side walls 39, 40 and end walls 41, 42 that extend vertically upwardly from the bottom side 38, and a rounded top side 43.

A plurality of inlet openings 44 (e.g., six round openings) are arranged across the bottom side 38 of the suction chamber 35. By spreading the inlet openings 44 across the planar bottom side 38 of the suction chamber 35, the screen assembly 10 can be used in very shallow (e.g., 4 inch) pumping conditions without sucking in air or causing the pump to lose its prime. A discharge opening 45 is provided through the end wall 42 of the suction chamber 35 for connecting the suction chamber 35 to a suction pipe 24 via the port 23 through the stationary plate 22 of the support structure 18 supporting the second end 14 of the drum 11. The discharge opening 45 allows water to flow from the suction chamber 35 into the suction pipe 24 during pumping operations.

A check valve assembly 46 is provided within the suction chamber 35 to prevent water from back flowing through the inlet openings 44 when the pump is off. The check valve assembly 46 includes a plurality of valve members 47 that move between closed and open positions. The valve members 47 each have a valve stem 48 that is slidably mounted above a respective one of the inlet openings 44, and a valve face 49 for covering the inlet opening 44. The valve stem 48 in one embodiment is a rod-shaped member with a threaded lower end 50.

The valve stems 48 are slidably received in a support structure 51 positioned above the inlet openings 44. The support structure 51 includes a plurality of brackets 52 attached (e.g., by welding) to the floor on the bottom side 38 of the suction chamber 35, and a longitudinal member 53 attached to and supported by the brackets 52 above the floor on the bottom side 38 of the suction chamber 35. The longitudinal member 53 has a plurality of bores 54 extending vertically therethrough. A plurality of tubular members 55 are coupled to the bores 54 and extend vertically therefrom to guide the valve stems 48 for sliding movement in a vertical direction within the tubular members 55. In one embodiment, the tubular members 55 are short pipe segments having threaded lower ends 56 that are coupled with corresponding threads in the bores 54 of the longitudinal member 53. The upper ends 57 of the pipe segments are also threaded and are covered by a threaded cap 58. The caps 58 function to prevent debris, particularly sand and sediment, from entering the tubular members 55 and interfering with sliding movement of the valve stems 48 within the tubular members 55 during operation. The brackets 52, longitudinal member 53, tubular members 55 and caps 58 all remain fixed within the suction chamber 35 during operation.

The valve members 47 have valve faces 49 connected to the valve stems 48. The valve faces 49 each have a shape (e.g., round) and size that completely covers the respective inlet openings 44 when the valve members 47 are in their closed positions. A pliable material 60, such as rubber, can be placed over the valve face 49 to engage an inner surface 61 surrounding the inlet opening 44 of the suction chamber 35 to provide a better seal over the inlet opening 44 when the valve member 47 is in its closed position.

Figure 1:
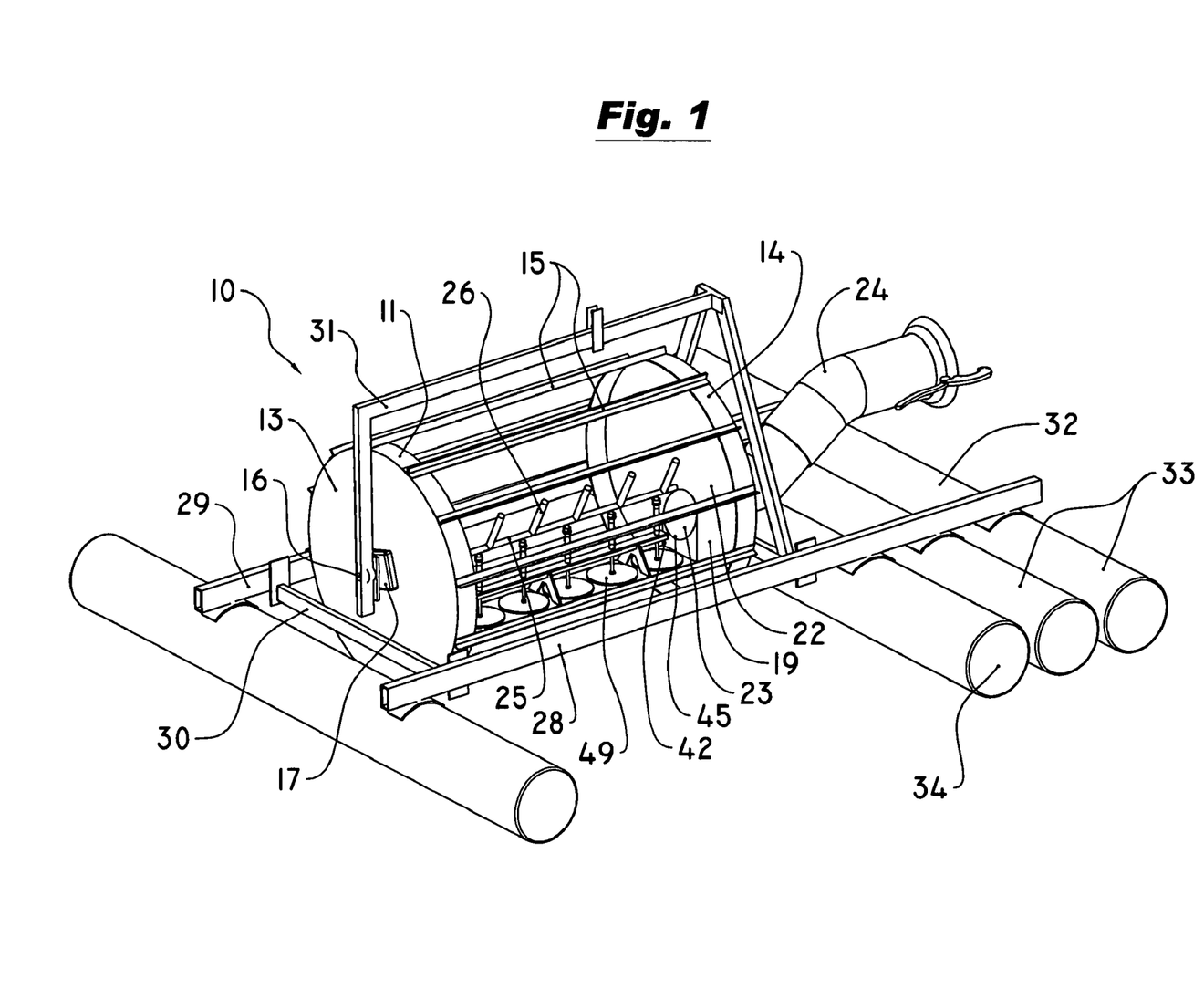
FIG. 1 is a perspective view of a self-cleaning screen having a rotatable drum with a check valve assembly contained within the drum according the present invention.
Figure 2:
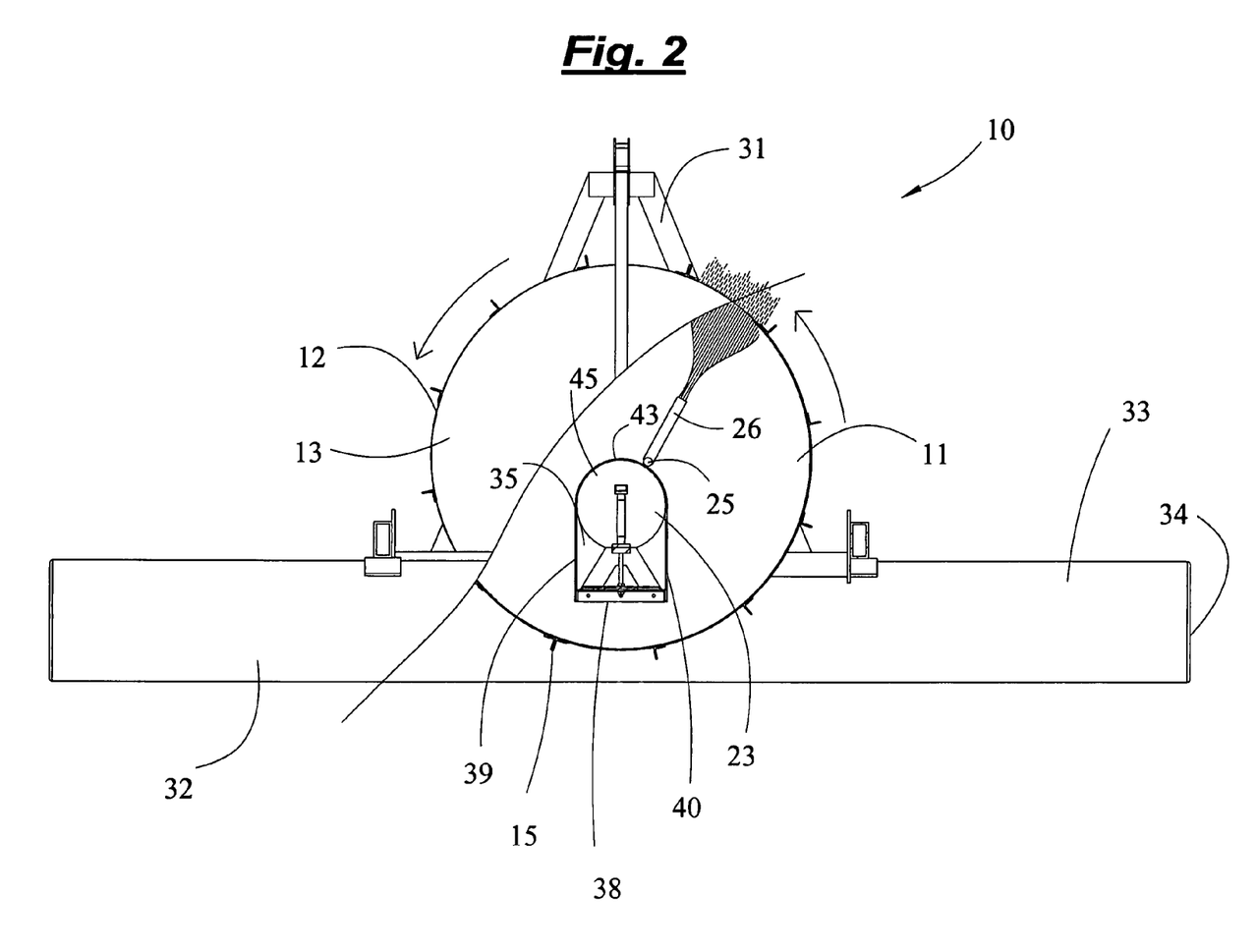
FIG. 2 is an end view of the self-cleaning screen shown in FIG. 1, with a cutaway portion to illustrate the check valve assembly contained within the drum.
Figure 3:
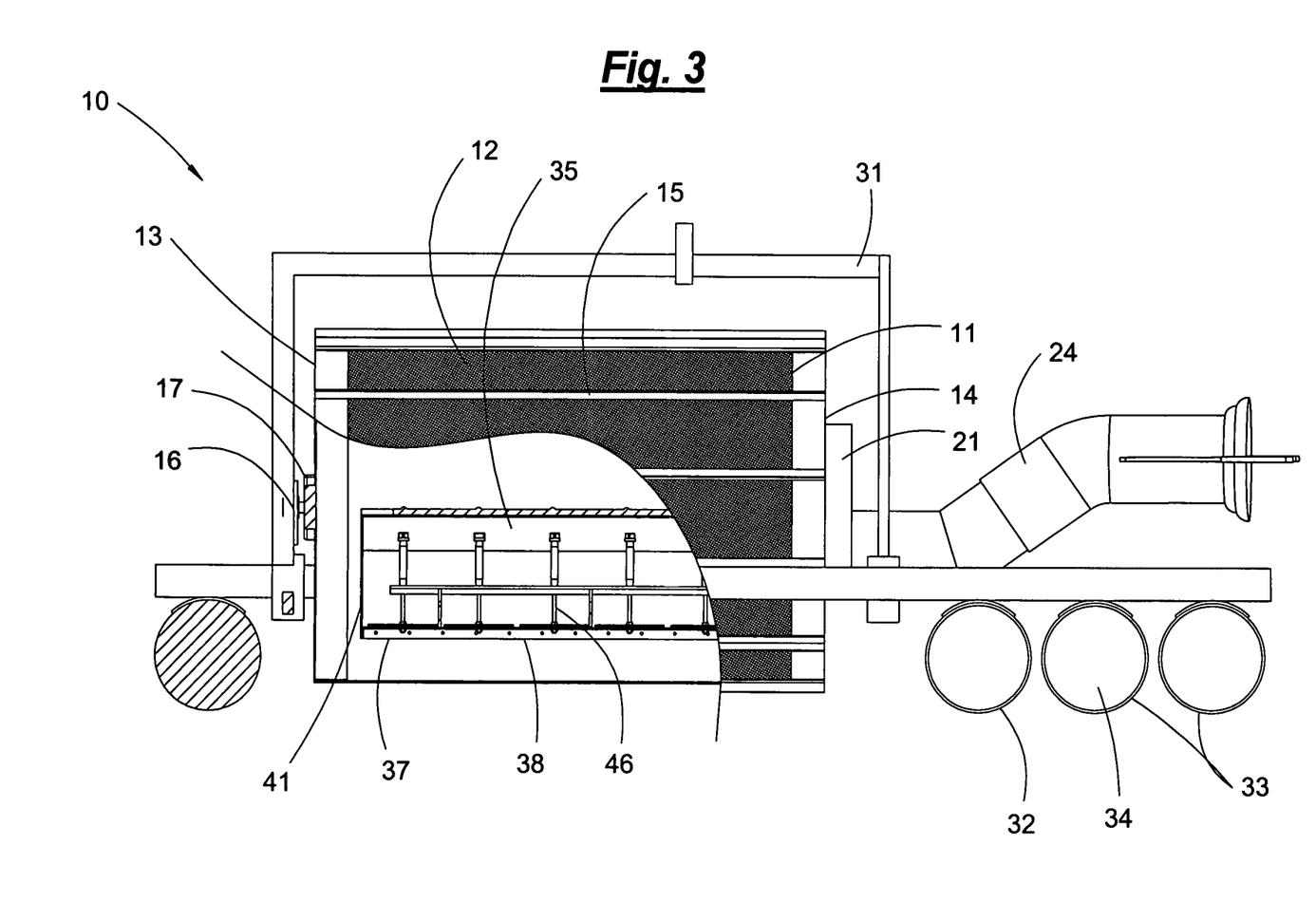
FIG. 3 is an elevation view of the self-cleaning screen shown in FIG. 1, with a cutaway portion to illustrate the check valve assembly contained within the drum.
Figures 4, 5:
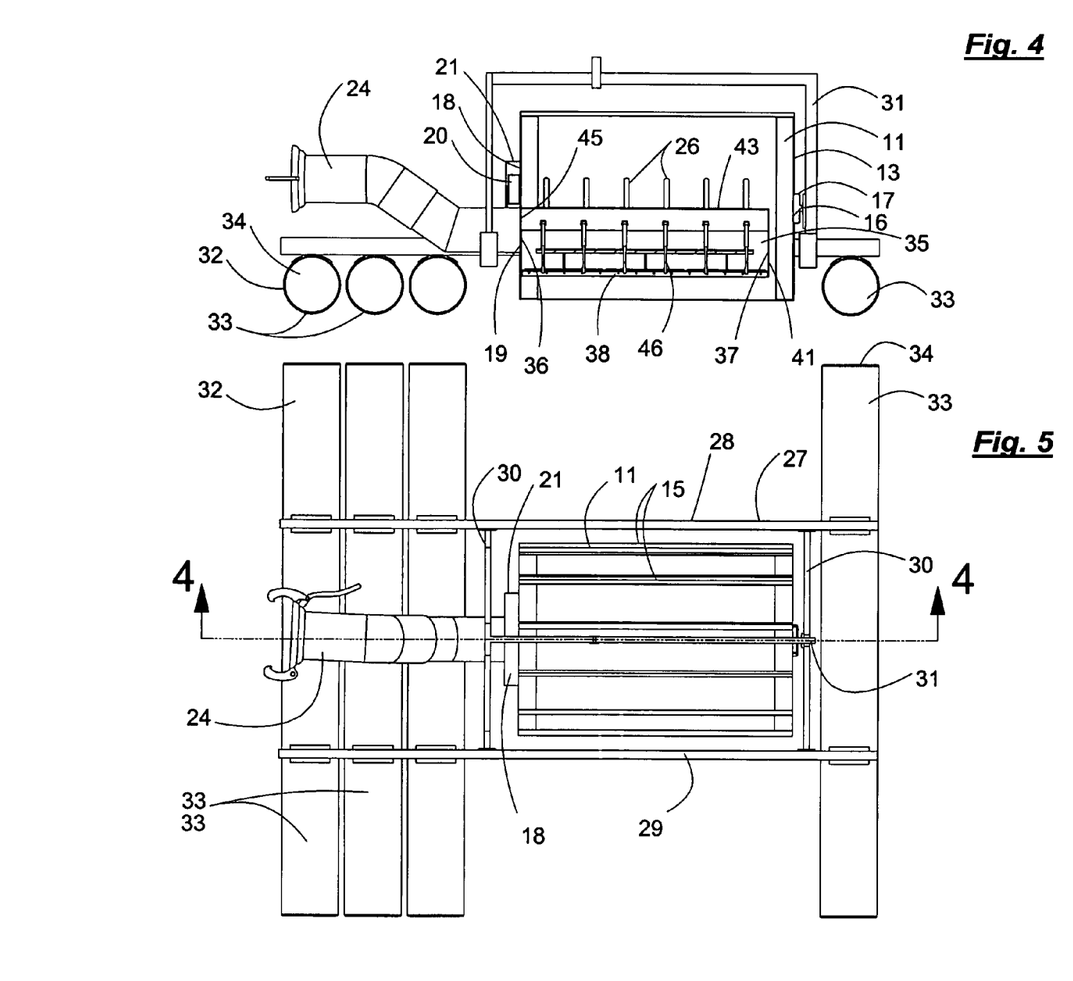
FIG. 4 is a cross section elevation view of the self-cleaning screen of FIG. 1, as viewed along the line 4-4 in FIG. 5.
FIG. 5 is a plan view of the self-cleaning screen shown in FIG. 1.
Figure 6:
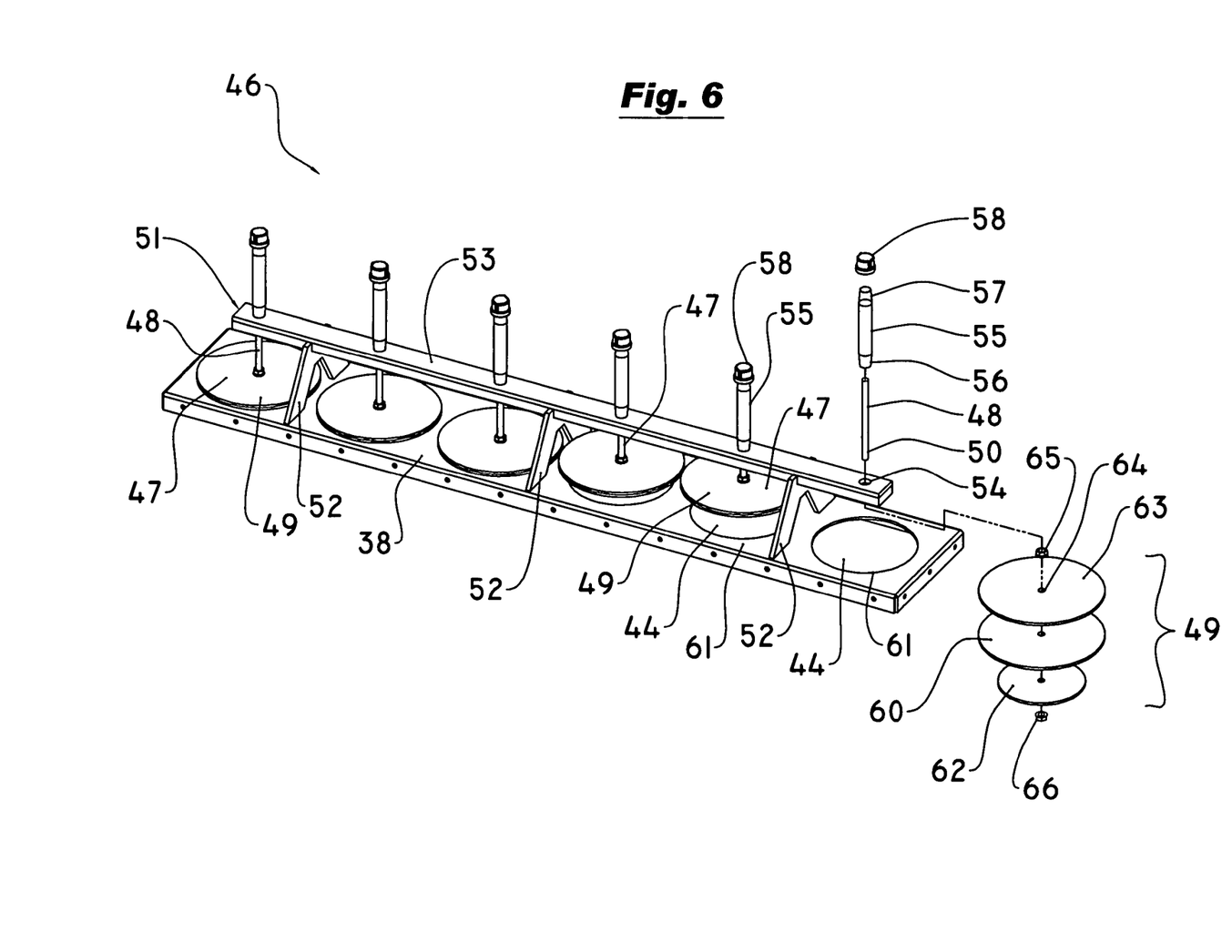
FIG. 6 is a perspective view of the check valve assembly according to the present invention.
Figure 7:
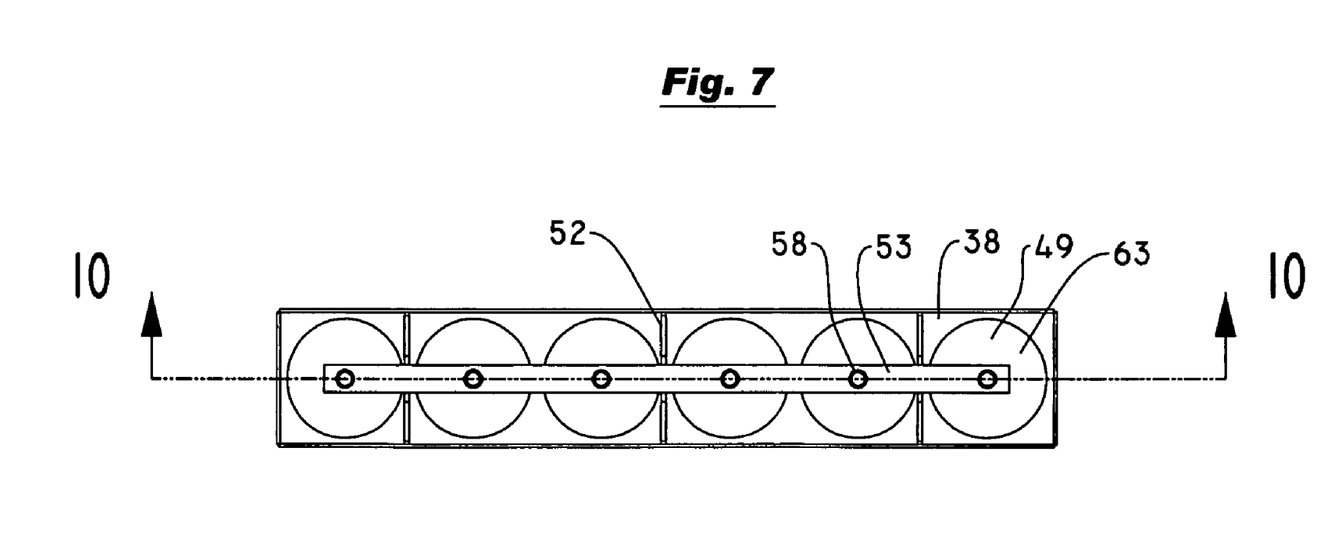
FIG. 7 is a plan view of the check valve assembly according to the present invention.
Figure 8:
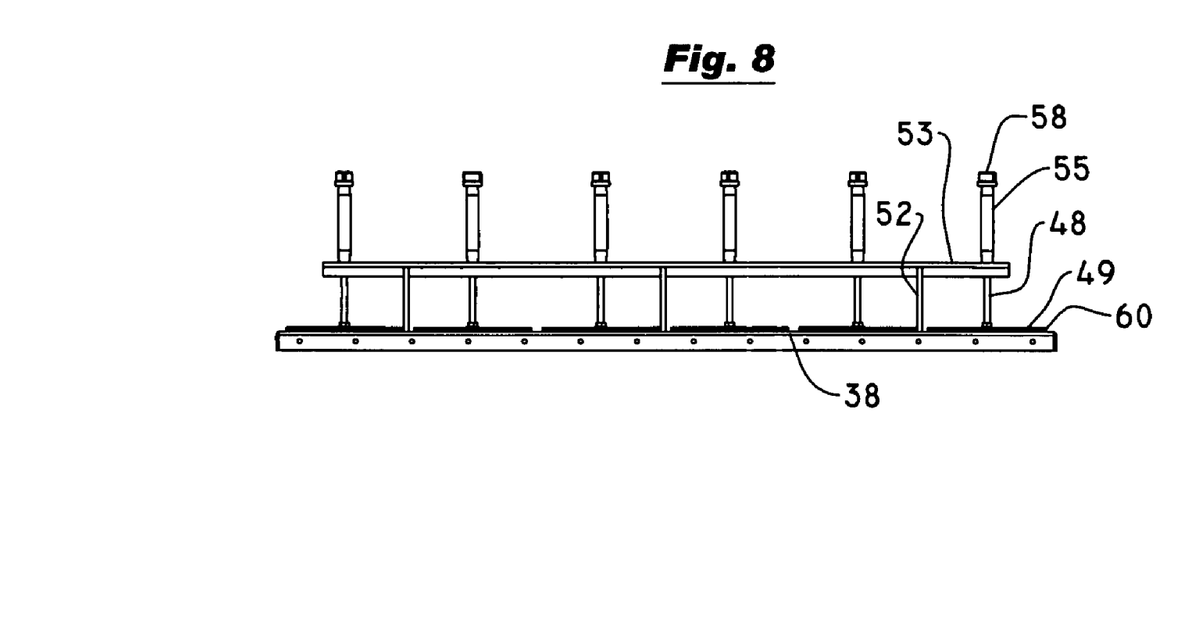
FIG. 8 is an elevation view of the check valve assembly with the valve members in their closed positions.
Figure 9:
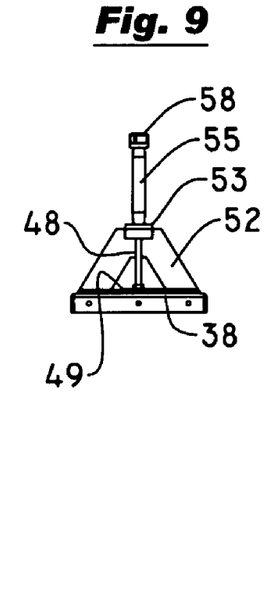
FIG. 9 is an end view of the check valve assembly with the valve members in their closed positions.
Figure 10:
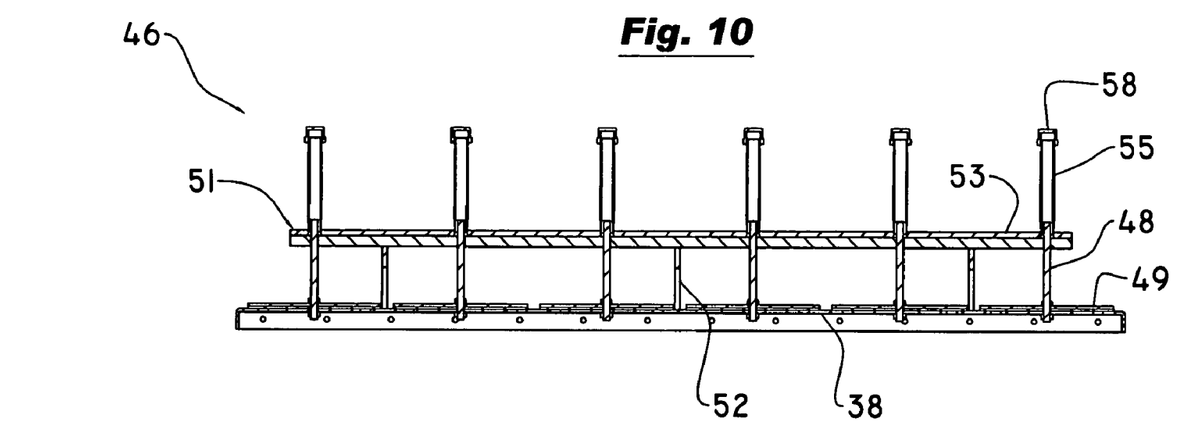
FIG. 10 is a cross section view of the check valve assembly with the valve members in their closed positions, as viewed along line 10-10 in FIG. 7.
Figure 11:
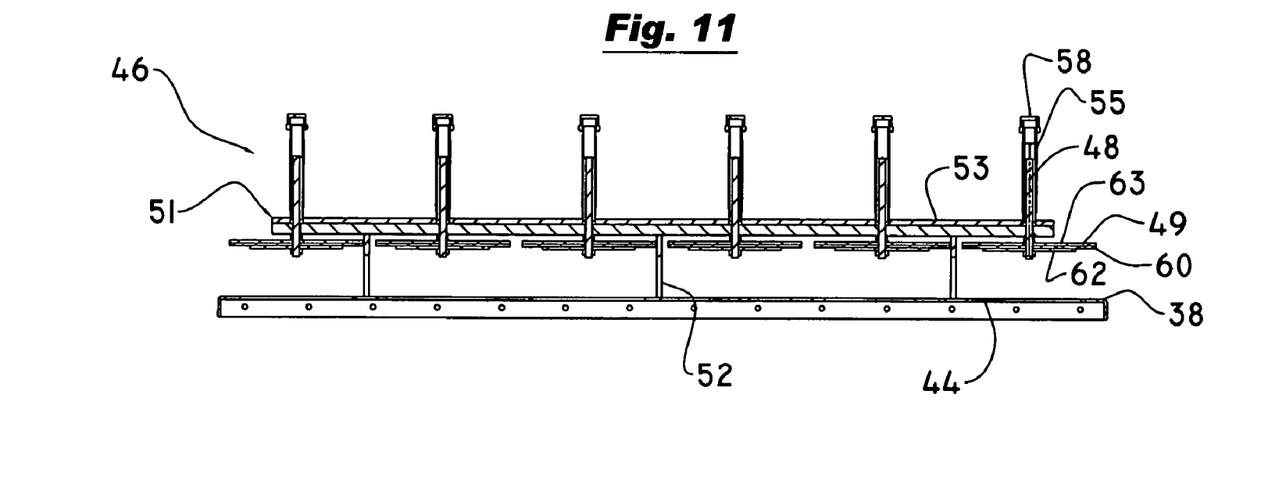
FIG. 11 is a cross section view of the check valve assembly similar to FIG. 10, with the valve members in their open positions.
Figure 12:
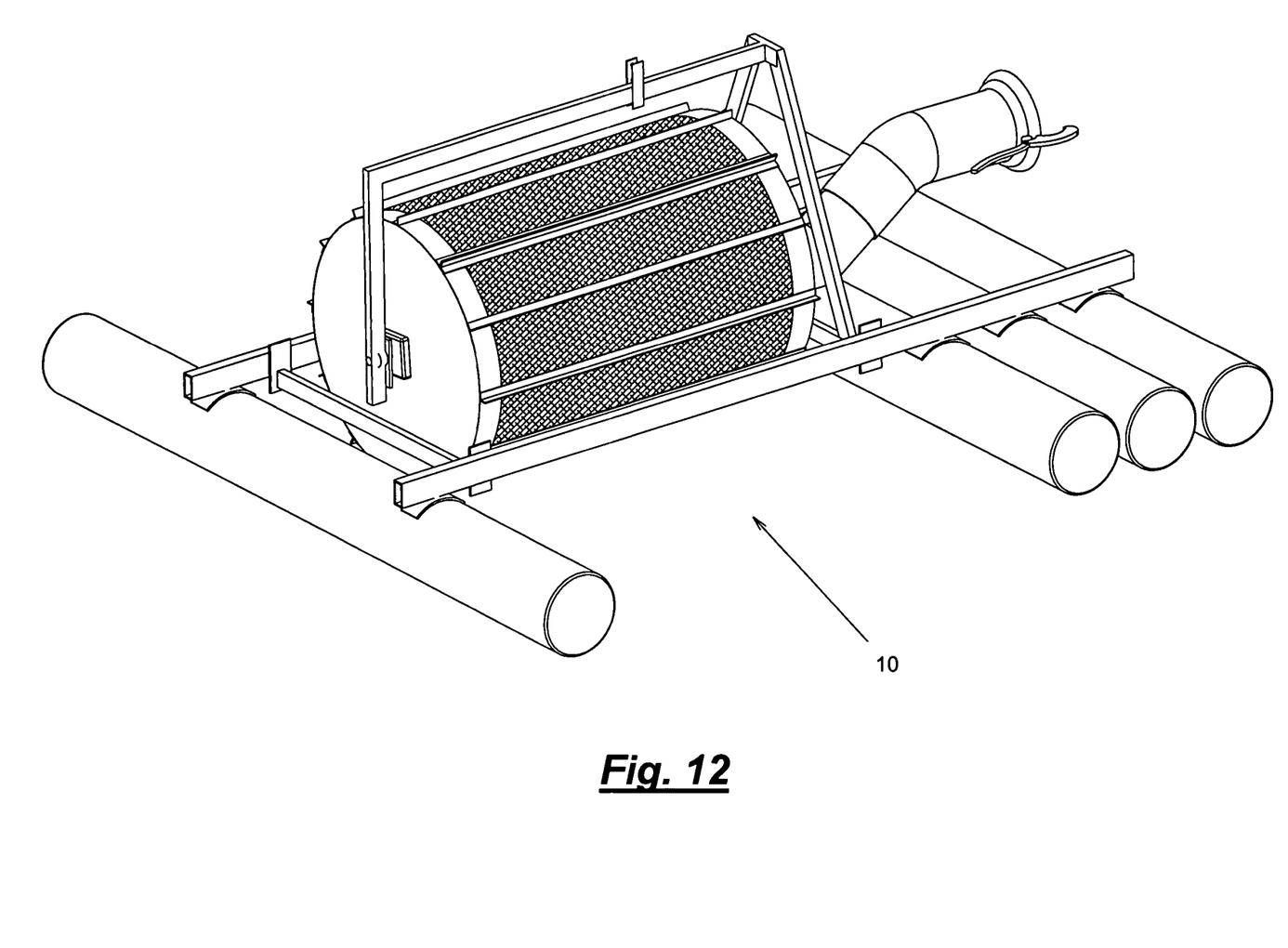
FIG. 12 is a perspective view of the self-cleaning screen shown in FIG. 1 with the internal components hidden by the mesh material of the screen.

As shown in FIG. 6, each valve face 49 can be formed by sandwiching the pliable material 60 between two rigid plate members 62, 63. The lower plate member 62 has a smaller diameter than the pliable material 60 and the upper plate member 63 to thereby expose an outer portion of the lower side of the pliable material 60. A central bore 64 is provided through the plate members 62, 63 and the pliable material 60. The lower end 50 of the valve stem 48 passes through the central bore 64. A pair of threaded nuts 65, 66 are threaded onto the lower end of the valve stem 48 above and below the valve face assembly 49 for fixing the parts 60, 62, 63 together. With this construction the valve members 47 can be assembled together after the brackets 52, longitudinal member 53 and tubular members 55 are all fixed to the bottom side 38 of the suction chamber 35.

The valve members 47 are movable upwardly from their closed positions (FIGS. 8-10) to their open positions (FIG. 11) upon movement of water through the inlet openings 44 into the suction chamber 35, and return to their closed positions by force of gravity when water stops flowing into the suction chamber 35. In their closed positions, the valve members 47 maintain water in and above the suction chamber 35, and hence the suction pipe 24, to thereby keep the pump primed between pumping times (e.g, between irrigation waterings, or as the pump is cycled off and on periodically for irrigation scheduling or maintenance).

In operation, the self-cleaning screen 10 of the present invention will be placed in a water source with a suction pipe 24 extending between the screen 10 and a centrifugal pump. The centrifugal pump will then need to be primed in a conventional manner by using either a vacuum pump or by filling the suction pipe 24 and suction chamber 35 with water from a source other than the centrifugal pump itself. Once the suction pipe 24 is full of water so that the centrifugal pump is primed with water, the pump can be started and operated in a normal fashion. However, once the pump is stopped, the check valve assembly 46 will function to prevent the water from back flowing out of the suction chamber 35 to thereby maintain a prime in the pump. Thus, the pump can be stopped and started without repriming after the initial prime is placed in the suction pipe 24 and the suction chamber 35.

It will be appreciated that various changes can be made in the embodiment described above without departing from the present invention. For example, the size and number of inlet openings 44 through the bottom side 38 of the suction chamber 35 can be varied; the shape of the suction chamber 35 can be changed; and the structure of and support for the rotating drum 11 can be changed. Also, it will be appreciated that the invention can be used in connection with the pumping of fluids other than water, and that the term "water" as used throughout the specification and claims herein should be construed as covering all such fluids. Also, the term "suction pipe" used throughout the specification and claims should be construed as covering any pipe, hose or other similar structure used to supply water to a centrifugal pump or other type of pump positioned above a water source being pumped.

While the invention has been specifically described in connection with specific embodiments thereof, it is to be understood that this is by way of illustration and not of limitation, and the scope of the appended claims should be construed as broadly as the prior art will permit.

What is claimed is:

1. A self-cleaning screen assembly for use in shallow water pumping, comprising:
   a rotatable drum comprising a screen for removing debris from water as the water passes into the drum, said drum being supported for rotation about a horizontal axis during operation;
   a suction chamber positioned within the drum and a discharge opening for discharging water out of the suction chamber to feed a suction pipe of a pumping unit, said suction chamber defined by a horizontally extending structure having an opening along a bottom portion of said horizontally extending structure and a plate positioned within said opening, said plate having a plurality of inlet openings arranged therein for receiving water from within a lower part of the drum; and
   a check valve assembly for allowing water to pass into the inlet openings of the plate during water pumping, and for preventing water from passing back through the inlet openings when the water pumping ceases to thereby maintain a prime in a pump above the suction chamber;
   said check valve assembly comprising a plurality of valve members arranged to move vertically within said suction chamber, each of said valve members comprising a valve stem and a valve face with said valve stem being slidably received in a support structure for allowing the valve member to move between a closed position in which the valve face covers a respective one of said inlet openings and an open position in which the valve face is displaced from its respective inlet opening, said valve members being arranged to move vertically upwardly from their closed positions to their open positions upon movement of water through said inlet openings into said suction chamber.

2. The self-cleaning screen assembly according to claim 1, wherein said support structure comprises a tubular member arranged in a vertical orientation to guide said valve stem for sliding movement in a vertical direction between said closed and open positions.

3. The self-cleaning screen assembly according to claim 2, further comprising a cap positioned over a top end of said tubular member to prevent debris from entering said tubular member and interfering with sliding movement of the valve stem within said tubular member.

4. The self-cleaning screen assembly according to claim 1, wherein said valve members are arranged to move vertically downwardly from their open positions to their closed positions by force of gravity when water stops flowing into said suction chamber to thereby prevent water from back flowing through said inlet openings.

5. The self-cleaning screen assembly according to claim 4, wherein said support structure comprises a bracket attached to said suction chamber and a longitudinal member supported by said bracket above a floor of said suction chamber, said longitudinal member having a plurality of bores extending vertically therethrough, and a plurality of tubular members coupled to said bores and extending vertically therefrom to guide said valve stems for sliding movement in a vertical direction within said tubular members between said closed and open positions.

6. The self-cleaning screen assembly according to claim 1, wherein said valve face comprises a pliable material for engaging an inner surface of the inlet opening of the suction chamber to seal the inlet opening when the valve member is in its closed position.

7. A pumping system, comprising:
a suction pipe for supplying water to a centrifugal pump;
a screen for preventing debris from entering the suction pipe, said screen comprising a rotatable drum supported for rotation about a horizontal axis during operation;
a suction chamber positioned within the drum and a discharge opening for discharging water out of the suction chamber to feed a suction pipe of a pumping unit, said suction chamber mounted within said drum so that the suction chamber remains stationary as the drum rotates around the suction chamber, said suction chamber defined by a horizontally extending structure having an opening along a bottom portion of said horizontally extending structure and a plate positioned within said opening, said plate having a plurality of inlet openings arranged therein for receiving water from within a lower part of the drum; and a check value assembly positioned within said suction chamber to maintain a prime in said suction pipe when the pumping system is stopped, said check valve assembly comprising a plurality of valve members arranged to move vertically within said suction chamber, each of said valve members comprising a valve stem and a valve face, said valve stem being slidably received in a support structure for allowing the valve member to move between a closed position in which the valve face covers a respective one of said inlet openings and an open position in which the valve face is displaced from its respective inlet opening, said valves members being arranged to move vertically upwardly from their closed positions to their open positions upon movement of water through said outlet openings into said suction chamber.

8. The pumping system according to claim 7, wherein said valve members are arranged to move vertically downwardly from their open positions to their closed positions by force of gravity when water stops flowing into said suction chamber to prevent water from back flowing through said inlet openings.

9. The self-cleaning screen assembly according to claim 1, wherein said plate is generally planar, said plurality of inlet openings comprises at least three inlet openings formed in said plate and arranged side-by-side in a longitudinal direction of said suction chamber, and said check valve assembly comprises at least three valve members arranged to cover said inlet openings, respectively.

10. The self cleaning screen assembly according to claim 9, wherein said suction chamber comprises six inlet openings spread across said plate, and wherein said check valve assembly comprises six valve members arranged to cover said six inlet openings.

11. The pumping syste according to claim 7, wherein said plate is generally planar, said plurality of inlet openings comprises at least three inlet openings formed in said plate and arranged side-by-side in a longitudinal direction of said suction chamber, and said check valve assembly comprises at least three valve members arranged to cover said inlet openings, respectively.

12. The pumping system according to claim 11, wherein said suction chamber comprises six inlet openings spread across said plate, and wherein said check valve assembly comprises six valve members arranged to cover said six inlet openings.

* * * * *